3,069,389
SUSPENSION POLYMERIZATION OF ACROLEIN
Frank J. Welch, Charleston, W. Va., assignor to Union
 Carbide Corporation, a corporation of New York
 No Drawing. Filed May 10, 1961, Ser. No. 109,014
 12 Claims. (Cl. 260—67)

The present invention relates to the polymerization of vinyl monomers, and is especially concerned with an improved process for the suspension polymerization of acrolein.

It is known that the suspension polymerizaton of acrolein can be carried out in an essentially non-aqueous system by using an inert liquid organic diluent, and by contacting the monomer therein with a conventional free radical polymerization catalyst such as a peroxide or azo compound, at a temperature of from about 50° C. to about 100° C. Unfortunately, however, the polymeric products formed by the suspension polymerizaton of acrolein in a non-aqueous system as described above are ordinarily characterized by having a relatively low molecular weight, as determined, for example, by measuring the reduced viscosity of the polymer. The reduced viscosity of such a polymer, it has been found, is generally less than about 0.5, when measured at a temperature of 30° C., from an aqueous saturated sulfur dioxide solution containing 0.2 gram of polymer in 100 milliliters of soluton. Thus, as a consequence of their relatively low molecular weight, many potential uses for the polyacrolein products, and particularly those uses which depend upon the mechanical properties and/or strength of the polymer, are precluded.

The suspension polymerization of acrolein has also been carried out in an aqueous system, i.e., using water as the diluent, and using as the free radical polymerization catalyst a peroxide or azo compound as described above, or a conventional redox catalyst of the type commonly used in free radical catalyzed addition polymerization reactions. The reaction temperature employed in conjunction therewith is ordinarily in the range of from about 0° C. to about 100° C. The polyacrolein products formed in this manner, it is to be noted, may have a somewhat higher molecular weight than that of the products obtained by the suspension polymerization of acrolein in a non-aqueous system as described above, due, in part, to the practicality of operation at lower polymerization temperatures when using certain catalysts such as the redox catalysts. Unfortunately, however, the aqueous suspension polymerization of acrolein is not without attendant disadvantages of its own. For instance, although polyacrolein is insoluble in water, and readily precipitates in an aqueous environment, the polymer has been found to absorb large quantities of water. As a consequence of this affinity for water, aqueous suspensions containing as little as about 10 to 15 percent by weight of polyacrolein have been found to form thick, heavy pastes or slurries which resist mechanical agitation; while aqueous suspensions containing about 30 perecent or more by weight of polyacrolein are, in effect, solids. Thus, it has been found that the aqueous suspension polymerization of acrolein can be carried out to a maximum total solids content of only about 10 to 15 percent by weight if sufficient agitation necessary to control the polymerization reaction is to be maintained in the system during the process.

This limitation insofar as the maximum solids content of the reaction product is concerned is undesirable for several reasons. First of all, the necessitiy for using a large volume of diluent in order to obtain a satisfactory low total solids content in the system leads to an unconvenient operation in which large processing equipment must be employed in order to prepare relatively small amounts of polymer. Moreover, while the rate and degree of polymerization of acrolein in an aqueous suspension system has been found to increase as the concentration of monomer in the system is increased, the use of a high monomer concentration, taken with the limitation on the total solids content of the reaction product as hereinabove described, makes it necessary to carry out the polymerization to only low conversion, and therefore also requires the recovery and recycling of large amounts of unreacted monomer. In addition, the recovery of polyacrolein from aqueous suspensions having a total solids content of about 10 percent or more is at best difficult, due to the mechanical problems encountered when handling a thick paste or slurry.

Advantageously, in accordance with the present invention, it has now been found that a high molecular weight polyacrolein product can be obtained in a convenient and efficient manner, and in high conversions of up to about 90 percent or more, by the polymerization of acrolein in a mixed liquid diluent comprised of an aqueous diluent, i.e., water, which is acidic and necessarily dispersed in a non-aqueous diluent, i.e., an inert water-immiscible organic compound. It has also been found that a reaction product of high total solids content can be obtained by the practice of the present invention without adverse effect upon the control of the polymerization process. The simultaneous accrual of these advantages are in fact unexpected in view of the results heretofore encountered in connection with the polymerization of acrolein independently in aqueous and in non-aqueous systems as described above.

Without wishing to be bound by theory, it is believed that, during the practice of the present invention as herein described, the polymerization of acrolein actually takes place in the dispersed aqueous diluent in which the monomer is soluble. Any excess acrolein over that which is soluble in the aqueous diluent is initially contained in the continuous phase, i.e., the non-aqueous diluent in which the monomer is also soluble, and is absorbed into the aqueous phase as the polymerization reaction proceeds. As the polyacrolein product is formed, it absorbs the aqueous component of the mixed diluent, and gradually takes on the appearance of solid particles suspended or slurried in the non-aqueous phase. At the conclusion of the polymerization, the polyacrolein product can readily be separated from the liquid present, including the diluent and any unreacted monomer present, by filtration, evaporation, or in any other convenient manner, and is then preferably washed with water and dried. In this manner, polyacrolein can be obtained as a product of high molecular weight, as determined, for example, by measuring the reduced viscosity of the polymer, which, it has been found, is generally in the range of from about 0.5 to about 15 and even higher, when measured at a temperature of 30° C., from an aqueous saturated sulfur dioxide solution containing 0.2 gram of polymer in 100 milliliters of solution. In addition, the polymer is ordinarily recovered as a granular product varying in form from that of small beads to a free flowing, talc-like powder depending upon the particular reaction conditions employed, i.e., the degree of agitation, the nature and concentration of any emulsifier employed, etc.

Moreover, through the practice of the present invention, a high conversion of monomer to polymer can be obtained even when a high initial concentration of monomer in the aqueous diluent is employed. Concomitant therewith, a reaction product of high total solids content of about 30 percent by weight or more can rapidly be formed while the reaction mixture is still in the form of a fluid, readily stirrable suspension. Thus, control over the polymerization reaction can be maintained conveniently throughout the entire process.

A further advantage that accrues through the practice of this invention lies in the fact that the rate of polymerization of acrolein is subsantially unaffected by the presence of the anhydrous component of the mixed diluent. The rate of polymerization attained via the process of this invention has in fact been found to be very similar to the rate of polymerization of acrolein in an aqueous system when the two processes are compared under otherwise identical reaction conditions. Thus, while the dilution of the aqueous monomer-containing phase with large quantities of water, as otherwise dictated in connection with the conventional aqueous suspension polymerization of acrolein, tends to decrease the polymerization rate appreciably, the presence of a non-aqueous diluent in which the aqueous diluent is dispersed has not been found to affect the polymerization rate to any significant extent under the reaction conditions herein described. Under these conditions, the polymerization rate attained via the process of this invention is sufficiently rapid so that the process can be utilized satisfactorily on a commercial basis.

More particularly, the process of the present invention contemplates polymerizing acrolein in a liquid diluent comprised of a mixture of water and an inert water-immiscible organic compound in which the water is dispersed. As used herein, the term "inert water-immiscible organic compound," referring to the non-aqueous diluent, is intended to encompass the well-known class of aliphatic, cycloaliphatic and aromatic liquids which, (a) are immiscible with water, (b) are essentially inert to both the acrolein monomer and the polymeric product formed, and (c) do not inhibit conventional free radical polymerizations, such compounds being readily ascertainable by one skilled in the art in light of this disclosure. As illustrative of the inert water-immiscible organic compounds contemplated by this invention, there can be mentioned the saturated aliphatic hydrocarbons; the saturated cycloaliphatic hydrocarbons, including alkyl-substituted derivatives thereof, wherein the cyclic structure preferably contains from about 5 to about 7 carbon atoms and wherein any alkyl substituent thereon preferably contains from 1 to about 12 carbon atoms; and the aromatic hydrocarbons. Suitable saturated aliphatic hydrocarbons include, for example, butane, pentane, heptane, octane, decane, dodecane, heptadecane, octadecane and the like. Suitable saturated cycloaliphatic hydrocarbons include cyclopentane, cyclohexane, cycloheptane, methylcyclopentane, methylcyclohexane, dimethylcycloheptane, n-hexylcyclopentane, n-hexylcyclohexane, n-hexylcycloheptane, dodecylcyclopentane, n-dodecylcyclohexane, n-dodecylcycloheptane, and the like. Suitable aromatic hydrocarbons include benzene and the alkyl-substituted benzenes wherein the alkyl substituent(s) preferably contain from 1 to about 12 carbon atoms, as for example toluene, dimethylbenzene, dodecylbenzene, etc., and the like. Other inert water-immiscible organic compounds which are also suitable for use as the non-aqueous diluent in accordance with the process of this invention include alkyl esters of mono- and difunctional alkanoic acids, especially lower alkyl acetates, such as ethyl acetate, butyl acetate, etc.; organic ethers, especially lower dialkyl ethers, such as diethyl ether, di-n-butyl ether, etc.; the lower alkyl ethers of alkylene glycols, such as the dibutyl ether of ethylene glycol, etc.; alkyl- and aryl halides, such as butyl chloride, ethylene dichloride, chlorobenzene, etc.; organic ketones, especially lower alkyl ketones, such as ethyl butyl ketone, etc.; and the like. In addition, mixtures of the foregoing compounds, such as commercially available, purified, low-boiling kerosene and petroleum ether products can also be employed as the non-aqueous diluent. Primary alcohols, on the other hand, are unsuited for use as the non-aqueous diluent in the process of this invention since they tend to react with acrolein under the acidic conditions employed, and result in the production of a low molecular weight soluble polymeric product which is readily dissolved in common organic solvents, rather than a high molecular weight insoluble polymeric product as is produced by the process of this invention.

The inert water-immiscible organic compounds which are preferably employed as the non-aqueous diluent in accordance with the process of this invention are the saturated aliphatic hydrocarbons containing from about 4 to about 18 carbon atoms. Of these, pentane and heptane are especially preferred because of their availability and inertness.

The initial proportion of the inert water-immiscible organic compound used as the non-aqueous diluent in the process of this invention can be varied broadly. Thus, for example, for every part by weight of acrolein employed in the process, from about 1 to about 4 parts by weight of the non-aqueous diluent can be used. The preferred proportion of the non-aqueous diluent to acrolein varies in the range of from about 2 to about 3 parts by weight of the non-aqueous diluent per part by weight of acrolein. Higher proportions of non-aqueous diluent to acrolein can also be used, but are generally accompanied by little additional advantage. The amount of non-aqueous diluent should, on the other hand, be sufficient to provide an adequate dispersant for the polyacrolein product formed during the polymerization and to facilitate control over the polymerization reaction, and to this end, an initial proportion of at least about 1 part, or slightly less, by weight of the non-aqueous diluent per part by weight of acrolein is desirably employed.

The initial proportion of water used as the aqueous diluent in the process of this invention can also vary broadly. In this connection, it is desirable for instance, to use a minimal amount of water, since it has been found that the rate and degree of polymerization is directly proportional to the concentration of monomer in the aqueous diluent. At the same time, sufficient water should be employed in order to provide an adequate medium for the initiation of the polymerization. Thus, for every part by weight of acrolein, from about 0.2 to about 2 parts, or more, by weight of water can be used, with the preferred proportion of water to acrolein varying in the range of from about 0.4 to about 1 part by weight of water per part by weight of acrolein. Higher proportions of water to acrolein, while operable, are increasingly difficult to disperse in the non-aqueous diluent when the latter is employed in the proportions described above, while the conjunctive use of increasing proportions of the non-aqueous diluent to provide an adequate dispersant for the water would necessitate the use of larger processing equipment without attendant advantage in the amount of polymer that is produced. The use of lesser proportions of water, on the other hand, may effect the physical properties of the resulting polymer product to some extent, in that a harder, less tractable polymer is obtained as the initial proportion of water to acrolein is decreased.

It is essential that the aqueous diluent be dispersed in the non-aqueous diluent during the practice of this invention. Such a dispersion can be effected and maintained, for example, by controlling the proportion in which the aqueous and non-aqueous diluents are present relative to each other. For instance, a substantial excess of non-aqueous diluent to aqueous diluent can be employed, preferably in a proportion of at least about 2:1 by weight. Sufficient agitation of the reaction mixture is also necessarily applied to effect and maintain the desired dispersion. The desired dispersion can also be promoted and maintained by the incorporation of an emulsification agent in the polymerization reaction mixture, accompanied, again, by sufficient agitation. Conventional emulsification agents, or emulsifiers, which produce water-in-oil emulsions rather than the usual oil-in-water emulsions should be used. If oil-in-water type emulsifiers are instead used, the initial dispersion of monomer and non-aqueous diluent in water thereby produced becomes very thick and viscous, and as the polymerization proceeds, is very hard to stir, so that an important advantage of the process of this invention insofar as ease and mechanical handling is concerned would be lost. Among the suitable water-in-oil emulsifiers which can be used in the process of this invention are the polyol stearates and oleates, such as sorbitan monooleate and pentaerythritol monostearate, etc.; amphoteric surface active agents, such as n-substituted amino acid derivatives (β-alanines), such as N-tallow β-iminodipropionate, etc.; lanolin; polyalkylene glycol ethers, such as the alkyl and alkyl phenyl esters of polyethylene glycol etc., and the like. Mixed emulsifiers can also be employed, if desired. The effect of a particular emulsifier depends, of course, to some extent upon the polymerization temperature, the ratio of aqueous to non-aqueous diluent, the particular non-aqueous diluent employed, etc.

The amount of emulsifier, when employed, need only be sufficient to promote and maintain a water-in-oil dispersion, and can vary, for example, from about 0.005 part by weight, or lower, to about 0.05 part by weight, or higher, per part by weight of monomer. Within this range, an increase in the concentration of emulsifier has been found to favor the recovery of a polyacrolein product in powder form, while a decrease in concentration favors the production of polyacrolein in the form of beads of increasing diameter. A greater amount of emulsifier can also be used, but is ordinarily accompanied by little additional advantage. In some cases, beneficial results are also obtained by using, in addition to the water-in-oil emulsifier, a small amount of water-soluble, oil-in-water emulsifier such as sodium lauryl sulfate, sodium octyl sulfate, sodium dioctyl phosphate, etc., in order to reduce the surface tension of the aqueous diluent, such amount naturally being insufficient to promote an oil-in-water emulsion. Of course, the use of an emulsifier can be omitted entirely if desired, providing other controls are maintained to assure the dispersion of the aqueous diluent in the non-aqueous diluent as described above.

It is also essential that the diluent employed in accordance with the process of this invention, and especially the aqueous diluent, be acidic, i.e., have a pH of less than 7, and preferably in the range of from about 2 to about 3, if a high molecular weight polyacrolein product is to be obtained. When the diluent is at a pH above 7, uncontrolled polymerization by condensation mechanisms, resulting in the production of a low molecular weight polymer, is frequently encountered. The pH of the diluent can be maintained below 7 by the incorporation in the reaction mixture of a suitable amount of an acid such as sulfuric acid, hydrochloric acid, phosphoric acid, nitric acid, acetic acid, etc., or in any other convenient manner.

Moreover, it is known that acrolein is easily oxidized in the presence of air, producing undesirable oxidation products and possibly causing the termination of any polymerization reaction in which an acrolein monomer is employed. It is highly desirable therefore to conduct the process of this invention in an inert atmosphere, i.e., free of oxygen, so as to prevent the possible oxidation of acrolein. Suitable gasses which can be used to provide an inert atmosphere include nitrogen, carbon dioxide, argon, methane, ethane and the like.

While the polymerization process of this invention can be carried out in the absence of a catalyst, and initiated, for example, thermally or by radiation, such as by ultraviolet or X-ray radiation, a catalytic amount of a free radical polymerization catalyst is preferably incorporated in the polymerization reaction mixture, wherein it is contacted with the monomer at a temperature as described below. The term "free radical polymerization catalyst," as employed herein, is intended to define compounds which contain —O—O— or —N=N— structural linkages, or are capable of forming such linkages by the action of dilute inorganic acids, or which otherwise produce free radicals in situ during the polymerization reaction. Typical free radical polymerization catalysts which can be employed in the process of this invention include, by way of illustration, hydrogen peroxide; organic peroxides, such as benzoyl hydroperoxide, acetyl hydroperoxide, lauroyl hydroperoxide, di-tertiarybutyl peroxide, tertiarybutyl hydroperoxide, cumene hydroperoxide, dibenzoyl peroxide, methyl benzoyl peroxide, acetyl benzoyl peroxide, peracetic acid, etc.; ammonium persulfate and alkali metal-persulfates, such as sodium- and potassium persulfates, etc.; alkali metal- and ammonium percarbonates and perborates; alkyl percarbonates, such as isopropyl percarbonate and butyl percarbonate, etc.; azo compounds such as 2,2'-azobisisobutyronitrile, dimethyl 2,2'-azobisisobutyrate, 2,2'-azobis(2,4-dimethylvaleronitrile), 2,2'-azobisisobutyramide, etc.; trialkylborons, such as tributylboron and trioctylboron, etc., and the like. Also contemplated by the term "free radical polymerization catalyst" are the conventional water-soluble redox catalysts of the type commonly used in addition polymerization reactions. More particularly, the redox polymerization catalysts are those combinations of certain reducing agents with the free radical polymerization catalysts specifically described above, especially those containing an —O—O— structural linkage, which provide greatly accelerated rates of polymerization. The reducing agents, one or more of which can be employed in the process of this invention, include, by way of illustration, sulfurous acid; alkyl, alkali metal, and ammonium sulfites; alkali metal and ammonium bisulfites; sulfoxylates; alkyl, alkali metal, and ammonium nitrites; copper and iron salts, as well as other lower valence salts of polyvalent metals, and the like. As typical of the reducing agents there can be mentioned, by way of illustration, sodium bisulfite, potassium bisulfite, ammonium bisulfite, sodium sulfite, dibutyl sulfite, sodium formaldehyde sulfoxylate, sodium nitrite, potassium nitrite, ammonium nitrite, amyl nitrite, cuprous sulfate, cupric sulfate, ferrous sulfate, ferric sulfate, ferrous nitrate, ferric nitrate, titanous sulfate, etc., and the like. The preferred free radical polymerization catalysts employed in accordance with this invention are the water-soluble redox polymerization catalysts, since they are generally effective at lower temperatures and result in the production of a higher molecular weight polymeric product. Of these, the use of an alkali metal persulfate-silver nitrate catalyst is especially preferred.

The concentration of catalyst, when employed, can be varied over a broad range and can be selected, for example, on the basis of the rate of polymerization desired, in that an increase in catalyst concentration affects an increase in the rate of polymerization. On the other hand, the catalyst concentration also affects the molecular weight of the polymeric product in that the molecular weight of the product generally decreases as the catalyst concentration increases. The molecular weight of the product is, however, more sensitively controlled by the polymerization temperature, varying inversely therewith, and by the concentration of monomer in the aqueous diluent, varying directly therewith.

The concentration of the free radical polymerization catalyst, when employed in accordance with this invention, can vary from about 0.01 percent by weight or lower, to about 5 percent by weight, or higher, based upon the weight of the acrolein monomer, and preferably is in the range of from about 0.05 percent by weight to about 2 percent by weight based upon the weight of the acrolein monomer. Higher catalyst concentrations can also be employed, accompanied, however, by little additional advantage. The concentration of the reducing agent component of the redox-type free radical polymerization catalyst, when employed in accordance with this invention, generally constitutes from about 1 to about 50 percent by weight of the total catalyst concentration. The concentration of the reducing agent component can vary, for example, from about 0.005 percent by weight, or lower, to about 2 percent by weight, or higher, based upon the weight of the acrolein monomer, and preferably is in the range of from about 0.01 percent to about 1 percent by weight based upon the weight of the acrolein monomer.

The polymerization temperature can vary from about 0° C. to about 100° C., and preferably is in the range of from about 0° C. to about 60° C. Moreover, when a thermally initiated polymerization is conducted, a reaction temperature of at least about 30° C. is desirably maintained. In addition, the polymerization process of this invention can be carried out under atmospheric, subatmospheric or superatmospheric pressure.

The polymerization period can also be varied broadly, and need only be sufficient to produce a polymeric product. Thus, for example, a polymerization period of from about 30 minutes, or less, to about 100 hours, or more, can be employed depending, for example, upon the temperature, catalyst, catalyst concentration, etc. During this period, agitation sufficient to maintain a dispersion should be applied to the polymerization reaction mixture. The polyacrolein product thus formed can then be recovered in any convenient manner as described above.

The relative molecular weight of the polyacrolein products produced by the process of this invention can readily be ascertained by a conventional determination of the reduced viscosity of the polymer. By the term "reduced viscosity," as employed herein, is meant the value obtained by dividing the specific viscosity of a polymer solution by the concentration of the polymer in the solution, the concentration being calculated in grams of polymer per 100 milliliters of solution at a given temperature. The specific viscosity of the polymer solution is obtained by dividing the difference between the viscosity of the polymer solution and the viscosity of the pure solvent by the viscosity of the solvent. The reduced viscosity of a polymer is taken as a measure of the molecular weight of the polymer in that a higher reduced viscosity indicates a higher molecular weight polymer. Conversely a lower reduced viscosity indicates a lower molecular weight polymer. In all cases the reduced viscosity values set forth herein were determined at a concentration of 0.2 gram of polymer per 100 milliliters of solution, and at a temperature of 30° C., using a saturated solution of sulfur dioxide in water as the solvent.

The high molecular weight polyacrolein products obtained by the process of this invention are particularly valuable as chemical intermediates. They can, for instance, be reacted with sodium bisulfite to yield useful, water-soluble addition products. The polyacrolein products are also useful as cross-linking agents for various polymers, including alkyd resins, and as leather tanning agents, etc.

The present invention can be illustrated further by description in connection with the following specific examples of its practice but is not intended to be limited thereto.

Example I

A polymerization bottle was charged with 70 grams of heptane, 25 grams of water adjusted to a pH of 2 by the addition of sulfuric acid, 21 grams of freshly distilled acrolein, and 1 gram of Arlacel 80 (a fatty acid ester of a polyol, sold by the Atlas Powder Company). After purging the bottle with nitrogen and chilling the contents to a temperature of 5° C., 0.15 gram of cumene hydroperoxide, 0.1 gram of sodium bisulfite (as a 10 percent by weight solution in water) and 0.005 gram of ferrous sulfate (as an approximately 1 percent by weight solution in water having a pH of 2) were added to the bottle. The bottle was sealed with a cap and rotated end-over-end in a water bath maintained at a temperature of 5° C. for a period of 18 hours. A free-flowing slurry of polyacrolein in heptane was formed. The polyacrolein product was then filtered, washed successively with water and acetone, and subsequently dried at room temperature. The amount of polyacrolein, thus obtained as a white powder having a reduced viscosity of 2.6, represented a 48 percent conversion.

Example II

A polymerization bottle was charged with 60 grams of benzene, 30 grams of water, 0.1 gram of 85 percent phosphoric acid, 30 grams of freshly distilled acrolein, 1 gram of Tergitol NP-14 (an alkyl phenyl ether of polyethylene glycol, sold by the Union Carbide Chemicals Company), 0.15 gram of potassium persulfate, and 0.05 gram of silver nitrate. The bottle was purged with nitrogen, sealed with a cap, and rotated end-over-end in a water bath maintained at a temperature of 27° C. for a period of 17 hours. A free-flowing slurry of polyacrolein in benzene was formed. The polyacrolein product was then filtered, washed successively with water and acetone, and subsequently dried at room temperature. A total of 12 grams of polyacrolein was obtained in this manner as a white powder having a reduced viscosity of 0.7.

Example III

A polymerization bottle was charged with 60 grams of ethyl acetate, 30 grams of water, 0.1 gram of 85 percent phosphoric acid, 30 grams of freshly distilled acrolein, 1 gram of Tergitol NP-14, 0.15 gram of potassium persulfate, and 0.05 gram of silver nitrate. The bottle was purged with nitrogen, sealed with a cap, and rotated end-over-end in a water bath maintained at a temperature of 27° C. for a period of 17 hours. A free-flowing slurry of polyacrolein in ethyl acetate was formed. The polyacrolein product was then filtered, washed successively with water and acetone, and subsequently dried at room temperature. A total of 9 grams of polyacrolein was obtained in this manner as a white powder having a reduced viscosity of 0.5.

Example IV

A polymerization bottle was charged with 60 grams of diethyl ether, 30 grams of water, 0.01 gram of 85 percent phosphoric acid, 30 grams of freshly distilled acrolein, 1 gram of Tergitol NP-14, 0.15 gram of potassium persulfate, and 0.05 gram of silver nitrate. The bottle was purged with nitrogen, sealed with a cap, and rotated end-over-end in a water bath maintained at a temperature of 27° C. for a period of 17 hours. A free-flowing slurry of polyacrolein in diethyl ether was formed. The polyacrolein product was then filtered, washed successively with water and acetone, and subsequently dried at room temperature. A total of 10 grams of polyacrolein was obtained in this manner as a white powder having a reduced viscosity of 0.61.

Example V

A polymerization bottle was charged with 60 grams of ethylene dichloride, 30 grams of water, 0.1 gram of 85 percent phosphoric acid, 30 grams of freshly distilled acrolein, 1 gram of Tergitol NP-14, 0.15 gram of potassium persulfate, and 0.05 gram of silver nitrate. The bottle was purged with nitrogen, sealed with a cap, and rotated end-over-end in a water bath maintained at a temperature of 27° C. for a period of 17 hours. A free-flowing slurry of polyacrolein in ethylene dichloride was formed. The polyacrolein product was then filtered, washed successively with water and acetone, and subsequently dried at room temperature. A total of 10 grams of polyacrolein was obtained in this manner as a white powder having a reduced viscosity of 0.7.

Example VI

A one-liter flask, fitted with a glass paddle stirrer, was purged with nitrogen and charged with 200 grams of heptane, 100 grams of water, 0.5 gram of 85 percent phosphoric acid, 100 grams of freshly distilled acrolein, 0.5 gram of potassium persulfate, and 0.1 gram of silver nitrate. The resulting mixture was stirred for a period of 6.5 hours while the temperature was maintained at 30° C. by means of an external water bath. A free-flowing slurry of polyacrolein in heptane was formed. The polyacrolein product was then filtered, washed successively with water and acetone, and subsequently dried at room temperature. The amount of polyacrolein, thus obtained as a white powder, represented an 88 percent conversion. The product was recovered in the form of spherical beads about 1 millimeter in diameter, and had a reduced viscosity of 2.4.

*Example VII*

A one-liter flask, fitted with a glass paddle stirrer, was purged with nitrogen and charged with 200 grams of heptane, 50 grams of water, 0.25 gram of 85 percent phosphoric acid, 100 grams of freshly distilled acrolein, 0.5 gram of potassium persulfate, 0.1 gram of silver nitrate and 3 grams of Tergitol NP-14. The resulting mixture was stirred for a period of 6.5 hours while the temperature was maintained at 30° C. by means of an external water bath. A free-flowing slurry of polyacrolein in heptane was formed. The polyacrolein product was then filtered, washed successively with water and acetone, and subsequently dried at room temperature. The amount of polyacrolein, obtained in this manner as a white powder having a reduced viscosity of 2.2, represented a 74 percent conversion.

*Example VIII*

An autoclave, fitted with a 3-blade stirrer, was charged with 32.1 pounds of a reaction mixture consisting of 400 parts by weight of heptane, 100 parts by weight of water, 100 parts by weight of freshly distilled acrolein, 1.9 parts by weight Tergitol NP-27 (an alkyl phenyl ether of polyethylene glycol, sold by Union Carbide Chemicals Company), 0.5 part by weight of 85 percent phosphoric acid, 0.5 part by weight of potassium persulfate, and 0.1 part by weight of silver nitrate. The mixture, which had an initial pH of 3.2, was placed under a pressure of 6 pounds per square inch gauge of nitrogen and was stirred for a period of 12 hours while the temperature was maintained at 20° C. by means of an external water bath. A free-flowing slurry of polyacrolein in heptane, having a total solids content of 10.4 percent by weight, was formed. The polyacrolein produced was then filtered, washed successively with water and acetone, and dried at room temperature. The amount of polyacrolein, thus obtained as a white powder having a reduced viscosity of 2.7, represented a 63 percent conversion.

*Example IX*

An autoclave, fitted with a 3-blade stirrer, was charged with 32.2 pounds of a reaction mixture consisting of 250 parts by weight of heptane, 50 parts by weight of water, 100 parts by weight of freshly distilled acrolein, 2 parts by weight of Tergitol NP-27, 0.25 part by weight of 85 percent phosphoric acid, 0.5 part by weight of potassium persulfate, and 0.05 part by weight of silver nitrate. The mixture, which had an initial pH of 2.5, was placed under a pressure of 8 pounds per square inch gauge of nitrogen and was stirred for a period of 16 hours while the temperature was maintained at 20° C. by means of an external water bath. A free-flowing slurry of polyacrolein in heptane, having a total solids content of 16 percent by weight, was formed. The polyacrolein product was then filtered, washed successively with water and acetone, and subsequently dried at room temperature. The amount of polyacrolein, thus obtained as a white powder having a reduced viscosity of 3.1, represented a 65 percent conversion.

*Example X*

An autoclave, fitted with a 3-blade stirrer, was charged with 32.2 pounds of a reaction mixture consisting of 400 parts by weight of heptane, 100 parts by weight of water, 100 parts by weight of freshly distilled acrolein, 1.9 parts by weight of Tergitol NP-27, 0.5 part by weight of 85 percent phosphoric acid, 0.5 part by weight of potassium persulfate, and 0.05 part by weight of silver nitrate. The mixture, which had an initial pH of 2.7, was placed under a pressure of 9 pounds per square inch gauge of nitrogen and was stirred for a period of 8 hours while the temperature was maintained at 37–41° C. by means of an external water bath. A free-flowing slurry of polyacrolein in heptane, having a total solids content of 4.8 percent by weight, was formed. The polyacrolein product was filtered, washed successively with water and acetone, and dried at room temperature. The amount of polyacrolein, thus obtained as a white powder having a reduced viscosity of 1.1, represented a 29 percent conversion.

*Example XI*

An autoclave, fitted with a 3-blade stirrer, was charged with 32.2 pounds of a reaction mixture consisting of 400 parts by weight of heptane, 50 parts by weight of water, 100 parts by weight of freshly distilled acrolein, 3 parts by weight of Tergitol NP-27, 0.25 part by weight of 85 percent phosphoric acid, 0.5 part by weight of potassium persulfate, and 0.1 part by weight of silver nitrate. The mixture, which had an initial pH of 3, was placed under a pressure of 5 pounds per square inch gauge of nitrogen and was stirred for a period of 27 hours while the temperature was maintained at 5° C. by means of an external water-brine bath. A free-flowing slurry of polyacrolein in heptane, having a total solids content of 11.8 percent by weight, was formed. The polyacrolein product was then filtered, washed successively with water and acetone, and subsequently dried at room temperature. The amount of polyacrolein, thus obtained as a white powder having a reduced viscosity of 5.7, represented a 65 percent conversion.

*Example XII*

An autoclave, fitted with a 3-blade stirrer, was charged with 32.2 pounds of a reaction mixture consisting of 300 parts by weight of heptane, 50 parts by weight of water, 100 parts by weight of freshly distilled acrolein, 0.25 part by weight of disodium N-tallow β-iminodipropinate, 0.11 part by weight of 85 percent phosphoric acid, 0.5 part by weight of potassium persulfate, and 0.1 part by weight of silver nitrate. The mixture, which had an initial pH of 4.5, was placed under a pressure of 7 pounds per square inch gauge of nitrogen and was stirred for a period of 31 hours while the temperature was maintained at 5° C. by means of an external water bath. A free-flowing slurry of polyacrolein in heptane, having a total solids content of 15 percent by weight, was formed. The polyacrolein product was then filtered, washed successively with water and acetone, and subsequently dried at room temperature. The amount of polyacrolein, thus obtained as a white powder having a reduced viscosity of 9.7, represented a 55 percent conversion.

*Example XIII*

A one-liter flask, fitted with a glass paddle stirrer, was charged with 300 grams of heptane, 100 grams of freshly distilled acrolein, 50 grams water, 0.2 gram 85 percent phosphoric acid, 2 grams of Tergitol NP-27, and 1 gram of acetyl hydroperoxide. The resulting mixture was stirred under reflux at a temperature of 55° C. in a nitrogen atmosphere for a period of 22 hours. A free-flowing slurry of polyacrolein in heptane was formed. The polyacrolein product was then filtered, washed successively with water and acetone, and subsequently dried at room temperature. A total of 17 grams of finely powdered polyacrolein, having a reduced viscosity of 0.83, were thus obtained.

*Example XIV*

A one-liter flask, fitted with a glass paddle stirrer, was charged with 200 grams of heptane, 100 grams of freshly distilled acrolein, 50 grams of water, 0.2 gram of 85 percent phosphoric acid, 2 grams of Tergitol NP-27, and 2 grams of 2,2'-azobisisobutyronitrile. The resulting mixture was stirred under reflux at a temperature of 55° C. in a nitrogen atmosphere for a period of 23 hours. A free-flowing slurry of polyacrolein in heptane was formed. The polyacrolein product was then filtered, washed successively with water and acetone, and subsequently dried at room temperature. A total of 22 grams of polyacrolein, having a reduced viscosity of 0.83, were thus obtained.

The process of this invention is capable of further modification, within the scope of the appended claims.

What is claimed is:

1. An improved process for the suspension polymerization of acrolein which comprises heating acrolein at a temperature of from about 30° C. to about 100° C., in a diluent comprised of water, adjusted to a pH of less than 7, and dispersed in an inert, water-immiscible organic compound, said water being present in a proportion of from about 0.3 to about 2 parts by weight thereof per part by weight of acrolein initially present and said organic compound being present in a proportion of from about 1 to about 4 parts by weight thereof per part by weight of acrolein initially present, and agitating the resultant reaction mixture sufficiently to maintain a dispersion of said water in said organic compound while maintaining the temperature of said reaction mixture within said temperature range for a period of time sufficient to produce a polymeric product.

2. An improved process for the suspension polymerization of acrolein which comprises contacting acrolein, at a temperature of from about 0° C. to about 100° C., with a free radical polymerization catalyst, in a diluent comprised of water, adjusted to a pH of less than 7, and dispersed in an inert, water-immiscible organic compound, said water being present in a proportion of from about 0.2 to about 2 parts by weight thereof per part by weight of acrolein initially present and said organic compound being present in a proportion of from about 1 to about 4 parts by weight thereof per part by weight of acrolein initially present, and agitating the resultant reaction mixture sufficiently to maintain a dispersion of said water in said organic compound while maintaining the temperature of said reaction mixture within said temperature range for a period of time sufficient to produce a polymeric product.

3. An improved process for the suspension polymerization of acrolein which comprises contacting acrolein, at a temperature of from about 0° C. to about 60° C., with a free radical polymerization catalyst, in a diluent comprised of water, adjusted to a pH of less than 7, and dispersed in an inert, water-immiscible organic compound, said water being present in a proportion of from about 0.4 to about 1 part by weight thereof per part by weight of acrolein initially present and said organic compound being present in a proportion of from about 2 to about 3 parts by weight thereof per part by weight of acrolein initially present, and agitating the resultant reaction mixture sufficiently to maintain a dispersion of said water in said organic compound while maintaining the temperature of said reaction mixture within said temperature range for a period of time sufficient to produce a polymeric product.

4. The process according to claim 3, wherein the organic compound is heptane.

5. The process according to claim 3, wherein the organic compound is benzene.

6. The process according to claim 3, wherein the organic compound is diethyl ether.

7. The process according to claim 3, wherein the organic compound is ethylene dichloride.

8. The process according to claim 3, wherein the free radical polymerization catalyst is acetyl hydroperoxide.

9. The process according to claim 3, wherein the free radical polymerization catalyst is 2,2'-azobisisobutyronitrile.

10. The process according to claim 3, wherein the free radical polymerization catalyst is a mixture of an alkali metal persulfate and silver nitrate.

11. The process according to claim 3, wherein the free radical polymerization catalyst is a mixture of potassium persulfate and silver nitrate.

12. The process according to claim 3, wherein the free radical polymerization catalyst is a mixture of cumene hydroperoxide, sodium bisulfite, and ferrous sulfate.

References Cited in the file of this patent

UNITED STATES PATENTS 2,996,481     Eifert et al. _____ Aug. 15, 1961

UNITED STATES PATENT OFFICE
CERTIFICATE OF CORRECTION

Patent No. 3,069,389　　　　　　　　　　December 18, 1962

Frank J. Welch

It is hereby certified that error appears in the above numbered patent requiring correction and that the said Letters Patent should read as corrected below.

Column 1, line 27, for "soluton" read -- solution --; line 67, for "necessitiy" read -- necessity --; column 5, line 10, for "esters" read -- ethers --.

Signed and sealed this 11th day of June 1963.

(SEAL)
Attest:

ERNEST W. SWIDER
Attesting Officer

DAVID L. LADD
Commissioner of Patents